United States Patent [19]

Cheng

[11] 4,418,050
[45] Nov. 29, 1983

[54] CARBON BLACK PROCESS

[75] Inventor: Paul J. Cheng, Bartlesville, Okla.

[73] Assignee: Phillips Petroleum Company, Bartlesville, Okla.

[21] Appl. No.: 411,230

[22] Filed: Aug. 25, 1982

[51] Int. Cl.$^3$ .................. C01B 31/02; C01B 31/14; C09C 1/48
[52] U.S. Cl. .................. 423/450; 423/449; 165/95; 23/314
[58] Field of Search ............ 423/449, 450, 455, 456; 165/95, 104.16; 23/314

[56] References Cited

U.S. PATENT DOCUMENTS

| | | | |
|---|---|---|---|
| 2,785,964 | 3/1957 | Pollock | 23/314 |
| 3,091,069 | 5/1963 | Brasefield | 23/314 |
| 4,289,742 | 9/1981 | Johnson | 423/450 |
| 4,296,800 | 10/1981 | Johnson | 423/450 |
| 4,302,423 | 11/1981 | Cheng et al. | 423/450 |
| 4,313,920 | 2/1982 | Cooper | 423/449 |

Primary Examiner—Gregory A. Heller

[57] ABSTRACT

Carbon black reactor effluent is quenched and is then passed to a carbon black preagglomeration zone prior to being passed through the tubes of a shell-tube in direct heat exchange zone. The preagglomeration zone produces larger particles of carbon black, thereby minimizing deposits of carbon on the inner peripheries of the tubes of the heat exchange zone so as to maintain the desired high heat transfer efficiency.

4 Claims, 1 Drawing Figure

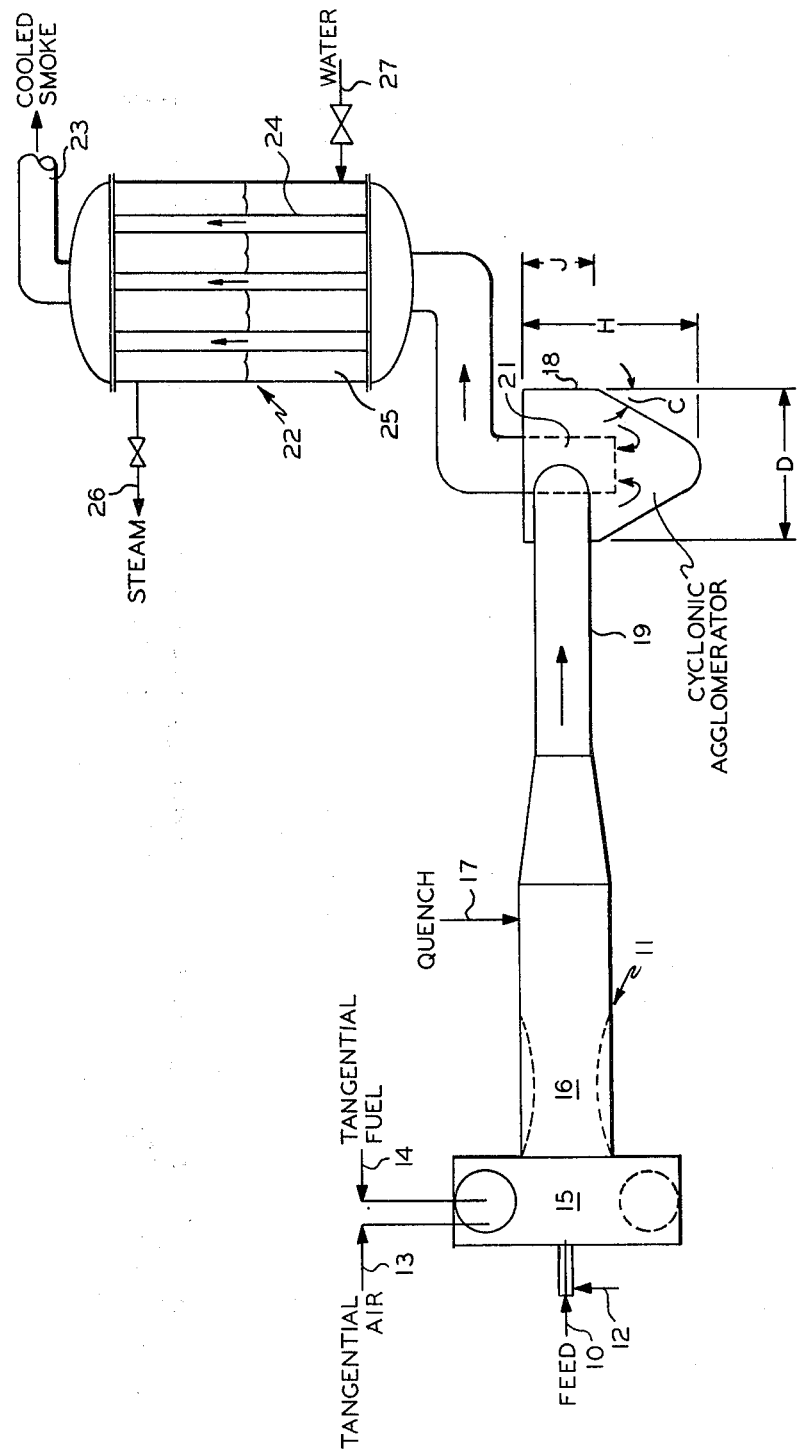

CARBON BLACK PROCESS

This invention relates to processes, apparatuses and systems for producing, agglomerating, and/or collecting carbon black. In accordance with one aspect, this invention relates to agglomerating carbon black particles in the effluent smoke coming from a carbon black producing furnace prior to passage of the effluent through the tubes of a shell tube heat exchanger. In accordance with a further aspect, this invention relates to agglomerating carbon black particles in smoke prior to being passed through the tubes of a shell-tube heat exchanger in indirect heat exchanger with a cooling fluid to minimize deposits of carbon in the inner peripheries of the tubes of the heat exchanger so as to maintain desired high heat transfer efficiency.

BACKGROUND OF THE INVENTION

In a typical furnace black process, a carbonaceous feed is introduced into a reactor and contacted with hot combustion gas which elevates the temperature of the feed to a temperature sufficiently high to decompose the feed to form particulate carbon black entrained in hot gas, the admixture referred to as reactor effluent or smoke. Such combustion products are typically at a temperature in the range of about 2400° F. to about 2900° F. The reactor effluent is cooled, usually by introducing a quench fluid into the smoke, to form an effluent containing particulate carbon black. The effluent is subsequently separated into a gas phase and a particulate carbon black phase by separating means such as a cyclone separator, bag filters, or the like. However, prior to the filtering or separation step the effluent should be cooled to a temperature sufficiently low to prevent damage to the separating means. A plurality of cooling steps can be employed.

It is common practice to initially cool or quench the reactor effluent by injecting directly thereinto quench fluid at one or more points in the quench chamber portion of the reactor. Typical quench fluids include water, cooled effluent or smoke, and/or off-gas, off gas being a portion of the gas phase separated from the effluent. Such a first cooling step normally lowers the temperature of the reactor effluent to a temperature of about 2000° F. or less and preferably between about 1600° and 2000° F. The first cooling is done to lower the temperature of the combustion products to a temperature which can be especially accommodated in an indirect heat exchange means and to a temperature below which no further production of carbon black occurs.

The second step of cooling involves the use of a first indirect heat exchange means, such as a shell-tube heat exchanger which further lowers the temperature of the effluent to a temperature of about 1200° F. or less and preferably between about 800° F. and about 1200° F. The thusly cooled effluent can then be passed to one or more economizers, e.g., indirect heat exchangers which are operable for heating air and/or carbonaceous feedstock to be introduced into the reactor. It is also common practice in the art when necessary to finally cool the effluent by injecting a trim quench fluid into the effluent before separating effluent into carbon black and off-gas. The final cooling lowers the temperature of the effluent to a temperature which can be especially accommodated by the separating means. Typically, this temperature would be below about 600° F. for bag filters. However, this temperature is dependent upon the type of bag filters or the type of separating means used. However, one problem encountered is that carbon black deposits tend to build up in the first indirect heat exchanger. A thin layer of the carbon black will substantially lower the heat transfer rate in the indirect heat exchanger. To clean the indirect heat exchanger to maintain high heat transfer rates, the reactor can be shut down and allowed to cool to a temperature at which the indirect heat exchanger can be partially disassembled for cleaning by methods well known in the art to remove carbon black deposits. However, such a cleaning method is wasteful, as the apparatus must be shut down to effect the cleaning and the indirect heat exchanger must be partially disassembled for cleaning. After the cleaning operation, the apparatus is placed back in operation and allowed a period of operating time which can be several hours to stablize before the production of carbon black is commenced. Such a method is wasteful of man hours, fuel, and production time.

The present invention provides a method and apparatus for producing carbon black which minimizes carbon black deposits in the indirect heat exchanger and, at the same time, maximizes the heat transfer efficiency without the aforementioned problems.

Accordingly, an object of this invention is to provide a method of producing carbon black which can be operated substantially continuously without need of completely terminating operations for cleaing of an indirect heat exchanger to maintain the desired high heat transfer rate.

A further object of this invention is to provide an apparatus to accomplish such a method.

Other objects, aspects, as well as the several advantages of the present invention will become apparent to those skilled in the art from the following detailed description taken in connection with the accompanying drawing and the appended claims.

SUMMARY OF THE INVENTION

According to the invention, a carbon black agglomeration zone is placed between the effluent outlet of the reaction zone and the inlet of the tube side of the shell-tube indirect heat exchange zone so as to minimize deposits of carbon black on the inner peripheries (smoke side) of the tubes of the heat exchange zone, and thereby maintain the desired high heat transfer rate or efficiency.

More specifically according to the invention, a carbon black producing process is provided which comprises injecting a hydrocarbon feed to a carbon black producing operation to form an effluent comprising carbon black smoke, quenching the smoke to reduce the temperature thereof, passing the quenched smoke through agglomeration zone to increase the particle size of the carbon black present in the smoke, then introducing and passing the smoke containing egglomerated carbon black to an indirect heat exchange zone so as to minimize deposits of carbon black on the inner peripheries of the tubes of the heat exchange zone to maintain the desired high heat transfer efficiency or rate.

In accordance with the invention, method and apparatus are provided for producing carbon black which can be operated substantially continuously without need of terminating operations for cleaning of an indirect heat exchanger to maintain the heat exchange at the desired high level.

DETAILED DESCRIPTION OF THE INVENTION

The advantages of the present invention will become apparent from the following detailed description taken in connection with the accompanying drawing to set forth by way of illustration and example specific embodiments of this invention. The drawing is a schematic illustration of a carbon black producing apparatus, including an agglomeration zone positioned between the carbon black producing apparatus and an indirect shell-tube heat exchanger.

Referring now to the drawing, hydrocarbonaceus feedstock 10 is charged axially into carbon black reactor designated 11. Nozzle cooling air is charged via 12. Tangential air or oxygen-enriched air is charged to the (pre)combustion zone 15 via conduit 13 and fuel is charged via conduit 14. Feedstock and hot combustion gases are admixed in zone 15 and pass via reaction zone 16, which can be a Venturi, during which time carbon black production is effected. The reaction mass from reaction zone 16 comprising carbon black and hot gases is quenched 17 using a quench fluid, e.g., water and/or cooled reactor effluent. The quenched mass admixed with quench fluid is passed to agglomeration zone 18 via tangential entry 19. This agglomeration zone (preagglomeration zone) is similar to a cyclone separator except there is no underflow or bottoms separated solids removal. Due to the vortex flow within zone 18, the particulate carbon black is partially agglomerated producing larger particles of carbon black suspended and entrained in gas. The mass from zone 18 is removed therefrom via overflow outlet 21 for ultimate recovery of carbon black from the gas. Preferably, the effluent from zone 18 is charged to a shell-tube boiler 22 to recover heat from this mass, prior to further additional cooling of the stream 23 indirectly, as by indirect heating of process air 13 and feedstock 10. The further cooled mass of agglomerated carbon black in gas is charged to a conventional bag filter means (not shown) from which off-gas freed of caron black and product carbon black are separately recovered. The off-gas can be used as a low Btu value fuel gas. The product carbon black can be pelleted (and dried, if wet pelleting is used) and recovered as carbon black product for blending into rubber or other conventional use. The pelleter means and drying means, both conventional, are not shown in order to simplify the drawing.

The preagglomeration provides at least two important functions. Besides producing larger agglomerates of carbon black which are charged to the bag filter and which agglomerates require less filter bag capacity for recovering the carbon black, the preagglomerated carbon black acts to prevent or minimize deposits of carbon black on the inner peripheries of tube 24 in the waste heat shell-tube boiler 22, thereby maintaining efficient heat exchange between the hot fluid flowing through the tubes 24 and the water 25 in the shell, to produce high pressure steam recovered at 26. Feedwater is added at 27.

In order to illustrate operability of the present invention, the following example is provided. The example is a calculated example representing continuous production of agglomerated carbon black of increased particle size between the carbon black reactor and the indirect heat exchange zone comprising a shell-tube boiler.

| BEST MODE CALCULATED EXAMPLE | |
|---|---|
| (10) Feedstock, gallons/hour | 348 |
| BMCI, | 128 |
| 50% Boiling Point, °F., | 800 |
| Temperature, °F. | 300 |
| (12) Axial (Nozzle-cooling) Air, SCF/hr., | 4,000 |
| (13) Tangential Air, SCF/hr., | 208,000 |
| Temperature, °F., | 780 |
| Pressure, psig., | 6 |
| (14) Tangential Fuel ($CH_4$), SCF/hr., | 12,600 |
| Temperature, °F., | 85 |
| Pressure, psig., | 25 |
| (17) Quench Water, gallons/hr., | 230 |
| Temperature, °F., | 80 |
| (19) Mass in Conduit 19 | |
| SCF/hr., | 322,000 |
| Lbs Carbon Black/1000 SCF, | 5.3 |
| Average Particle Size, microns, | 0.031 |
| Temperature, °F., | 2,000 |
| (21) Mass in Conduit 21 | |
| SCF/hr., | 322,000 |
| Lbs Carbon Black/1000 SCF, | 5.3 |
| Average Particle Size, Microns, | 0.5 |
| Temperature, °F., About | 2,000 |
| (23) Effluent Gas-Carbon Black from 22 | |
| SCF/hr., | 322,000 |
| Lbs Carbon Black/1000 SCF, | 5.3 |
| Average Particle Size, microns, | 0.6 |
| Temperature, °F., | 1200 |
| (27) Boiler Feed Water, | |
| Gallons/hr., | 1020 |
| Temperature, °F., | 460 |
| Pressure, psia, | 610 |
| (26) Steam Product (Saturated) | |
| Lbs/hour, | 8500 |
| Temperature, °F., | 485 |
| Pressure, psia., | 600 |
| (22) Shell-Tube Boiler | |
| Number of Tubes 24 | 180 |
| Diameter of Tubes 24, inches, | 2" O.D. 1.5" I.D. |
| Length of Tubes 24, feet | 14 |
| Shell Diameter, feet, | 4 |
| Shell Height (Tube Sheet) feet, | 16 |
| (18) Preagglomerator | |
| (H) Height, feet, | 6 |
| (J) Upper Cylinder Height, feet, | 2 |
| (D) Diameter, feet, | 4 |
| (C) Slope Angle, degrees, | 24 |
| (19) Tangential Inlet | |
| Diameter, inches, | 15 |
| (21) Conduit Overflow Outlet (Axially Positioned) | |
| Diameter, inches, | 15 |
| Length, feet, | 4 |

The bottom of unit 18 is curved, e.g., radius of curvature of 5 inches for best operation of the preagglomerator.

The dimensions of the preagglomerator 18, given above, are typical for the flow rates in conduit 19.

The preferred velocity range of the mass entering agglomerator 18 via 19 is about 200 feet/second to about 500 feet/second.

The ratio of velocity of gases entering 19 to the diameter D of Unit 18 is preferably in the range of about 150 feet/second/foot of diameter to about 500 feet/second/foot of diameter.

Carbon black particles suspended in hot gases tend to deposit on the relatively cold tube walls, and this deposite acts as an insulation, thereby decreasing the rate of heat transfer from the hot gases containing carbon black within the tubes to the water within the shell-side of the shell-tube heat exchanger.

Although thermal force is responsible for the movement of the carbon black particles to the inner wall of the tube, van der Walls force determines whether or not the particles are to adhere to the walls. Thermal force is directly proportional to the diameter of the carbon black particle and temperature gradient in the particle-moving field. Van der Walls force is inversely proportional to the distance between the objects, in this case the particle radius to the sixth power. Consequently, as the particle moves closer to the wall, the particle size becomes an increasingly determining factor for the particle to adhere or not to adhere to the wall. The smaller the particle, the better the chance for the particle to adhere to the wall and to reduce the heat transfer efficiency. The bulk stream carries away particles which are too large to adhere to the wall. This is to say, if the particles are increased in diameter (preagglomerated) before they enter the tubes of the shell-tube waste heat boiler, the plastic deposits on the tube wall will decrease allowing the desired high heat transfer coefficient for desired high rate of heat exchange between the hot smoke and the water.

Agglomeration is a function of time and collision frequency. The agglomerator illustrated in the example allows increasing the average particle size diameter in stream 19 from about 0.031 microns to about 0.5 microns as the particles exit in conduit 21. Even some additional agglomeration will occur in the tubes 24, and the average particle size will be about 0.6 microns in diameter.

Although I have illustrated my agglomerator 18 as a cyclonic type, it is to be understood that a baffled chamber type agglomerator can be used for this desired agglomeration.

The larger agglomerates produced in my invention are more easily filtered.

It is to be understood that while there has been illustrated and described certain forms of the present invention, it is not to be limited to the specific form or arrangement of parts or steps herein described and shown except to the extent that such limitations or their equivalents are found in the claims.

I claim:

1. A process for producing carbon black by pyrolysis of a feed hydrocarbon which comprises:
   (a) subjecting the feed hydrocarbon to carbon black producing conditions in a carbon black reaction zone to form a gaseous effluent comprising carbon black smoke containing finely divided carbon black particles,
   (b) quenching said effluent to substantially reduce the temperature thereof,
   (c) passing said quenched smoke to a preagglomeration zone operated under conditions which form agglomerated carbon black particles of increased size in said smoke, and
   (d) flowing the fluids from (c) containing agglomerated carbon black particles through tubular flow path of an indirect heat exchange zone to thereby minimize deposition of carbon black on the walls of said flow path, and increase the heat transfer coefficient of said indirect heat exchange zone.

2. A process according to claim 1 wherein said free agglomeration zone (c) comprises a cyclone or baffled agglomeration zone.

3. A process according to claim 1 wherein the temperature of the smoke following quench is in the range of about 2000° F. and the effluent removed from heat exchange zone (d) is about 700° F.

4. A process according to claim 1 wherein said effluent is quenched to a temperature of about 2000° F., said agglomeration zone (c) is a cyclone type agglomeration zone and wherein the effluent removed from indirect heat exchanger (d) is at a temperature of about 1200° F.

* * * * *